United States Patent
Roh et al.

(10) Patent No.: US 11,870,062 B2
(45) Date of Patent: Jan. 9, 2024

(54) METAL OXIDE COATED WITH CONDUCTIVE POLYMER, ELECTRODE FOR ELECTROCHEMICAL DEVICE COMPRISING THE SAME, AND METHOD OF PRODUCING THE METAL OXIDE

(71) Applicant: LG CHEM, LTD., Seoul (KR)

(72) Inventors: Jongmin Roh, Daejeon (KR);
Seokhyun Yoon, Daejeon (KR);
Byunggook Lyu, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 489 days.

(21) Appl. No.: 16/633,080

(22) PCT Filed: Oct. 19, 2018

(86) PCT No.: PCT/KR2018/012431
§ 371 (c)(1),
(2) Date: Jan. 22, 2020

(87) PCT Pub. No.: WO2019/098546
PCT Pub. Date: May 23, 2019

(65) Prior Publication Data
US 2020/0176764 A1 Jun. 4, 2020

(30) Foreign Application Priority Data

Nov. 20, 2017 (KR) ........................ 10-2017-0154710

(51) Int. Cl.
*H01M 4/36* (2006.01)
*H01G 11/26* (2013.01)
(Continued)

(52) U.S. Cl.
CPC ............ *H01M 4/366* (2013.01); *H01G 11/26* (2013.01); *H01G 11/46* (2013.01); *H01G 11/48* (2013.01);
(Continued)

(58) Field of Classification Search
CPC ...... H01M 4/366; H01M 4/505; H01M 4/624; H01M 10/052; H01M 10/054;
(Continued)

(56) References Cited

U.S. PATENT DOCUMENTS

| | | | |
|---|---|---|---|
| 2002/0034583 A1 | 3/2002 | Jung | |
| 2014/0315081 A1* | 10/2014 | Zhang | H01M 4/366 |
| | | | 427/560 |
| 2016/0079601 A1 | 3/2016 | Yoshitake et al. | |

FOREIGN PATENT DOCUMENTS

| | | | |
|---|---|---|---|
| CN | 101237036 B | * | 6/2010 |
| CN | 103000891 A | | 3/2013 |

(Continued)

OTHER PUBLICATIONS

Xu, Sheng, et al. "A mild surface washing method using protonated polyaniline for Ni-rich LiNi0. 8Co0. 1Mn0. 1O2 material of lithium ion batteries." Electrochimica Acta 248 (2017): 534-540. (Year: 2017).*

(Continued)

*Primary Examiner* — Victoria H Lynch
(74) *Attorney, Agent, or Firm* — BRYAN CAVE LEIGHTON PAISNER LLP (57) ABSTRACT

The present invention relates to a metal oxide coated with a conductive polymer, including: a metal oxide; and a coating layer which is formed on the surface of the metal oxide and includes a conductive polymer, wherein the conductive polymer is a polymer of protonated monomers.

6 Claims, 5 Drawing Sheets

(a)   (b)

(51) Int. Cl.
*H01G 11/46* (2013.01)
*H01G 11/48* (2013.01)
*H01M 4/505* (2010.01)
*H01M 4/62* (2006.01)
*H01M 10/052* (2010.01)
*H01M 10/054* (2010.01)
*H01M 4/02* (2006.01)

(52) U.S. Cl.
CPC ........... *H01M 4/505* (2013.01); *H01M 4/624* (2013.01); *H01M 10/052* (2013.01); *H01M 10/054* (2013.01); *H01M 2004/021* (2013.01)

(58) Field of Classification Search
CPC . H01M 2004/021; H01G 11/26; H01G 11/46; H01G 11/48
See application file for complete search history.

(56) References Cited

FOREIGN PATENT DOCUMENTS

| | | | |
|---|---|---|---|
| CN | 103985853 A | | 8/2014 |
| JP | 2002-025558 A | | 1/2002 |
| JP | 2002-358959 A | | 12/2002 |
| KR | 10-0316085 B1 | | 12/2001 |
| KR | 10-2006-0084886 A | | 7/2006 |
| KR | 10-2010-0055185 A | | 5/2010 |
| KR | 10-2011-0012845 A | | 2/2011 |
| KR | 10-1338550 B1 | | 12/2013 |
| KR | 10-2014-0119250 A | | 10/2014 |
| KR | 10-2016-0008589 A | | 1/2016 |
| KR | 20170061401 A | * | 6/2017 .......... H01M 10/052 |
| KR | 10-2017-0085195 A | | 7/2017 |
| KR | 10-2020-0007359 A | | 1/2020 |
| WO | 95/24741 A1 | | 9/1995 |
| WO | 2007091867 A1 | | 8/2007 |

OTHER PUBLICATIONS

English machine translation of Chen et al. (CN 101237036 B) (Year: 2010).*
Higgins, Roger WT, Naveed A. Zaidi, and Andy P. Monkman. "Emeraldine Base Polyaniline as an Alternative to Poly (3, 4-ethylenedioxythiophene) as a Hole-Transporting Layer." Advanced Functional Materials 11.6 (2001): 407-412. (Year: 2001).*
English machine translation of Chae et al. (KR 20170061401 A) (Year: 2017).*
Kim, Won-Keun, et al. "Al2O3 coating on LiMn2O4 by electrostatic attraction forces and its effects on the high temperature cyclic performance." Electrochimica Acta 71 (2012): 17-21. (Year: 2012).*
Gemeay, Ali H., et al. "Chemical preparation of manganese dioxide/ polypyrrole composites and their use as cathode active materials for rechargeable lithium batteries." Journal of the Electrochemical Society 142.12 (1995): 4190. (Year: 1995).*
Qu (2012).Core-Shell Structure of Polypyrrole Grown on V2O5 Nanoribbon as High Performance Anode Material for Supercapacitors. Adv. Energy Mater. vol. 2, Issue 8. pp. 950-955.
Wang (2013). Nanoporous LiMn2O4 spinel prepared at low temperature as cathode material for aqueous supercapacitors.Journal of Power Sources. vol. 242. pp. 560-565.
Ahn. (2010).Polyaniline Nanocoating on the Surface of Layered Li[Li0.2Co0.1Mn0.7] O2 Nanodisks and Enhanced Cyclability as a Cathode Electrode for Rechargeable Lithium-Ion Battery. The Journal of Physical Chemistry C.vol. 114. pp. 3675-3680.
Nishizawa (1997).Template Synthesis of Polypyrrole-Coated Spinel LiMn2O4 Nanotubules and Their Properties as Cathode Active Materials for Lithium Batteries.J. Electrochem. Soc. vol. 144. No. 6. pp. 1923-1927.

* cited by examiner

METAL OXIDE COATED WITH CONDUCTIVE POLYMER, ELECTRODE FOR ELECTROCHEMICAL DEVICE COMPRISING THE SAME, AND METHOD OF PRODUCING THE METAL OXIDE

The present application is a National Phase entry pursuant to 35 U.S.C. § 371 of PCT/KR2018/012431 filed on Oct. 19, 2018, and claims priority to and the benefit of Korean Patent Application No. 10-2017-0154710 filed with Korean Intellectual Property Office on Nov. 20, 2017, the entire content of which are incorporated herein by reference.

FIELD

The present invention relates to a metal oxide coated with a conductive polymer, an electrode for an electrochemical device including the same, and a method for producing the metal oxide coated with a conductive polymer.

BACKGROUND

As the demand for energy is dramatically increasing world-wide, the need for energy storage devices having a large energy storage capacity and high output is gaining attention. Thus, studies on supercapacitors having energy density as high as that of batteries, while being able to instantaneously release high-output energy as existing capacitors, have been conducted in various ways. Among them, a supercapacitor that stores energy through an oxidation/reduction reaction of metal ions using metal oxides as an electrode material has been known to have excellent specific capacitance as compared with a carbon material-based supercapacitor. Meanwhile, in the case of an organic electrolyte-based lithium ion batteries, there is a risk of explosion due to shock and heat, and thus research on a water-based lithium ion batteries using a water-based electrolyte has also been actively conducted.

In order to produce an electrode material with high output, high capacity, and excellent cycle stability, it is advantageous to increase the conductivity of metal oxides used as an electrode material so as to allow a smooth charge transfer during charging and discharging. This is because the charge transfer between an electrolyte and an electrode is accelerated when the conductivity is high, so that the oxidation/reduction reaction occurs rapidly without a loss of charge. However, since metal oxides do not have high conductivity except for a specific structure, an electrode is produced by simply mixing it with a carbon based-conductive material, but with only this method, it is difficult to expect high capacity. Therefore, a method of enhancing low conductivity of metal oxides by coating a substance having high conductivity on the surface of an electrode, and of improving cycle stability by additionally preventing elution of electrode materials, has been gaining attention.

SUMMARY

An object of the present invention is to provide a metal oxide coated with a conductive polymer capable of providing an electrode having high output, high capacity, and excellent cycle stability by increasing capacitance when the conductive polymer is uniformly coated on the surface of the metal oxide and is thus included in the electrode, and an electrode for an electrochemical device including the same.

Another object of the present invention is intended to provide a method for producing a metal oxide coated with a conductive polymer capable of coating the conductive polymer on the surface of the metal oxide and preventing polymerization of the conductive polymer, which is carried out outside the surface of the metal oxide.

According to one embodiment of the present invention, a metal oxide coated with a conductive polymer may be provided, including: a metal oxide represented by Chemical Formula (1) below; and a coating layer which is formed on a surface of the metal oxide and includes a conductive polymer, wherein the conductive polymer is a polymer of protonated monomers:

$$Li_xMn_yO_{4-z}A_z \quad (1)$$

wherein $0.7 \leq x \leq 1.3$, $1.7 < y < 2.3$, $0 \leq z < 0.2$, and A is one or more ions having a valence of −1 or −2.

According to another embodiment of the present invention, an electrode for an electrochemical device including the aforementioned metal oxide coated with a conductive polymer may be provided.

According to still another embodiment of the present invention, a method for producing a metal oxide coated with a conductive polymer may be provided, including: a protonation step of protonating a monomer; an adhesion step of stirring the protonated monomer and a metal oxide represented by Chemical Formula (1) to allow the protonated monomer to adhere to the surface of the metal oxide by electrostatic attraction; and a polymerization step of polymerizing the monomer to form a coating layer including a conductive polymer on the surface of the metal oxide.

Hereinafter, the method for producing a metal oxide coated with a conductive polymer according to specific embodiments of the present invention will be described in more detail.

BRIEF DESCRIPTION OF THE DRAWINGS

FIGS. 1(a) and (b) are images of the metal oxide coated with the conductive polymer of Example 1 taken using a scanning electron microscope (SEM) at magnification of 100,000 times and 50,000 times, respectively.

FIGS. 2(a) and (b) are images of the metal oxide coated with the conductive polymer of Example 2 taken using a scanning electron microscope (SEM) at magnification of 100,000 times and 50,000 times, respectively.

FIGS. 3(a) and (b) are images of the metal oxide coated with the conductive polymer of Example 3 taken using a scanning electron microscope (SEM) at magnification of 100,000 times and 50,000 times, respectively.

FIGS. 4(a) and (b) are images of the metal oxide coated with the conductive polymer of Example 4 taken using a scanning electron microscope (SEM) at magnification of 100,000 times and 50,000 times, respectively.

FIGS. 5(a) and (b) are images of the metal oxide coated with the conductive polymer of Example 5 taken using a scanning electron microscope (SEM) at magnification of 100,000 times and 50,000 times, respectively.

FIGS. 6(a) and (b) are images of the metal oxide coated with the conductive polymer of Example 6 taken using a scanning electron microscope (SEM) at magnification of 100,000 times and 50,000 times, respectively.

FIGS. 7(a) and (b) are images of $LiMn_2O_4$ which is not coated with the conductive polymer of Comparative Example 1 taken using a scanning electron microscope (SEM) at a magnification of 100,000 times and 50,000 times, respectively.

FIGS. 8(a) and (b) are images of the metal oxide coated with the conductive polymer of Comparative Example 2 taken using a scanning electron microscope (SEM) at magnification of 100,000 times and 50,000 times, respectively.

FIGS. 9(a) and (b) are graphs showing the results of measuring the specific capacitance of the metal oxides coated with the conductive polymers of Comparative Example 1 and Example 1.

FIGS. 10(a) and (b) are graphs showing the results of measuring the specific capacitance of the metal oxides coated with the conductive polymers of Examples 2 and 3.

DETAILED DESCRIPTION

Previously, in order to increase conductivity of an electrode active material, an electrode was produced by mixing an electrode active material with a conductive material such as a carbon material. However, when the size of the electrode active material is small and thus the surface area increases, there was a problem that the electrode including only a conductive material had low capacity and poor output characteristics, and thus, it was difficult to be used as an energy storage device having high storage capacity and high output.

However, the present inventors found that when a protonated monomer having a positive (+) charge is adhered to the surface of a metal oxide having a negative (−) charge by electrostatic attraction, followed by polymerizing the monomer, a conductive polymer is uniformly coated on the surface of the metal oxide, and also found through experiments that when the metal oxide is applied to an electrode as an electrode active material, the output, capacity, and cycle stability of the metal oxide are enhanced as compared with a metal oxide which is not coated with a conductive polymer, thereby completing the present invention.

Metal Oxide Coated with Conductive Polymer

The metal oxide coated with the conductive polymer according to one embodiment above may include: a metal oxide represented by Chemical Formula (1) below; and a coating layer which is formed on the surface of the metal oxide and includes a conductive polymer, wherein the conductive polymer may be a polymer of protonated monomers:

$$Li_xMn_yO_{4-z}A_z \quad (1)$$

wherein $0.7 \leq x \leq 1.3$, $1.7 < y < 2.3$, $0 \leq z < 0.2$, and

A is one or more ions having a valence of −1 or −2.

The metal compound represented by Chemical Formula (1) is a nanoparticle having a negative (−) charge, in which z may be 0 or more and less than 0.2, or more than 0 and less than 0.2. Even when z is 0 in the metal compound, the metal compound represented by Chemical Formula (1) may have a negative (−) charge because it has a hydroxyl group (—OH) on its surface.

The metal compound represented by Chemical Formula (1) may be a metal oxide represented by Chemical Formula (2) below:

$$Li_xM_{y2}Mn_{y1-y2}O_{4-z}A_z \quad (2)$$

wherein $0.7 \leq x \leq 1.3$, $1.7 < y1 < 2.3$, $0 < y2 < 0.2$, $0 \leq z < 0.2$, M is one or more elements selected from the group consisting of Al, Mg, Ni, Co, Fe, Cr, V, Ti, Cu, B, Ca, Zn, Zr, Nb, Mo, Sr, Sb, W, Ti, and Bi, and A is one or more ions having a valence of −1 or −2.

Conventionally, when the metal oxide is used as an electrode active material, a mixture of an electrode active material and a conductive material is used in order to increase the conductivity of the charge. However, an electrochemical oxidation/reduction reaction of the active material occurs only near the area where the conductive material is in contact with the active material on the entire electrode, thereby making it difficult for such an electrode to have high capacity.

However, as for the metal oxide coated with the conductive polymer according to one embodiment, the conductive polymer is uniformly coated on the surface of each metal oxide particle having low conductivity. Thus, when an electrode is produced by mixing the metal oxide (active material) coated with the conductive polymer and a conductive material, the entire surface of the active material may participate in the electrochemical oxidation/reduction reaction. Consequently, the electrode including the metal compound coated with the conductive polymer as an active material may exhibit high capacity characteristics. In addition, since the conductive polymer coats each of the metal oxide particles, when the electrode including the metal oxide as an active material continuously participates in the oxidation/reduction reaction, elution of some ions from the metal oxide can be prevented, thus providing the electrode having excellent cycle stability.

The conductive polymer is a polymer of protonated monomers having a positive (+) charge, and specifically, the conductive polymer is polymerized in a state in which the protonated monomer having a positive (+) charge is adhered to the surface of the metal oxide having a negative (−) charge by electrostatic attraction. The conductive polymer may include at least one polymer selected from the group consisting of polypyrrole, polyaniline, polythiophene, and polyindole.

Specifically, when the protonated monomer is added to a solution including the metal oxide and stirred, the protonated monomer may be strongly adhered to the surface of the metal oxide due to the electrostatic attraction, and may not be separately dissolved in the solvent. In this state, when a polymerization initiator is added and polymerization is carried out, the monomer adhered to the surface of the metal oxide is polymerized to form a conductive polymer, and such a conductive polymer may form a coating layer on the surface of the metal oxide.

If the metal oxide does not have a charge, or the monomer is not protonated so that it is not adhered to the surface of the metal oxide by the electrostatic attraction, the monomer may be dissolved in the solvent, and thus polymerization of the monomer may be separately performed at a location outside the surface of the metal oxide in the polymerization process. However, as for the metal oxide of the present invention, since the polymerization of the monomer is carried out on the surface of the metal oxide to form the conductive polymer coating, it is possible to increase the recovery rate of the metal oxide coated with the conductive polymer used as an electrode active material, and the coating layer may be evenly formed on the surface of the metal oxide without irregularities.

The coating layer evenly formed on the surface of the metal oxide may have surface roughness (Ra) of 0.1 to 5 nm. Also, the conductive polymer may be coated over 80 to 100%, 90 to 100%, or 100% of the total surface area of the metal oxide. When the conductive polymer is coated over less than 80% of the total surface area of the metal oxide, high capacity characteristics may not be exhibited from the electrode including the metal oxide as an active material, cycle stability may be decreased, or lithium ions may be eluted.

The thickness of the coating layer may be controlled by controlling the content of monomers to be polymerized on the surface of the metal oxide, but it may be, for example, 0.1 to 10 nm. When the thickness of the coating layer is less than 0.1 nm, high capacity characteristics of the electrode may not be exhibited, cycle stability may be decreased, or elements such as lithium may be eluted. Further, when the thickness is more than 20 nm, the movement of lithium ions may be interrupted, thus deteriorating electrochemical properties of the electrode.

Electrode for Electrochemical Device and Electrochemical Device

According to another embodiment of the present invention, an electrode for an electrochemical device including the metal oxide coated with the conductive polymer is provided. The metal oxide in which the conductive oxide is uniformly coated on the surface has high conductivity. Thus, when it is applied to an electrode for an electrochemical device, the output, capacity, and cycle stability of the electrode can be increased.

The electrode may be produced by a method in which a conductive material, a binder, and a solvent are mixed with the metal oxide coated with the conductive polymer and stirred to prepare a slurry, which is then coated on a current collector and compressed. Alternatively, the electrode may be produced by casting the slurry on a separate support and then laminating a film obtained by peeling it off from the support onto the current collector.

However, when an electrode is produced by mixing a metal oxide having a large surface area and low electrical conductivity with a conductive material, there is a problem that an electrochemical oxidation/reduction reaction occurs only near the area where the conductive material is in contact with an active material, resulting in low electrode capacity and output characteristics. However, the electrode according to one embodiment of the present invention is produced by using, as an active material, the metal oxide onto which the conductive polymer is uniformly coated on the surface thereof, and mixing the metal oxide with a conductive material, and thereby the electrochemical oxidation/reduction reaction can occur on the entire surface of the active material to increase the electrode capacity and output characteristics.

The current collector is not particularly limited so long as it has high electrical conductivity while not causing chemical change of the battery. For example, stainless steel, aluminum, nickel, titanium, sintered carbon, or aluminum, or stainless steel surface-treated with carbon, nickel, titanium, silver, etc., may be used. In addition, the current collector may generally have a thickness of 3 μm to 500 μm, and may form fine irregularities on its surface to enhance binding with the active material. For example, the current collection may be used in any of various forms including films, sheets, foils, nets, porous structures, foams, non-woven fabrics, etc.

Further, the binder serves to enhance adhesion between the metal oxide particles, and the binding between the metal oxide and the current collector. Specific examples thereof may include polyvinylidene fluoride (PVDF), a vinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), sulfonated EPDM, styrene butadiene rubber (SBR), fluoro rubber, or various copolymers thereof, and they may be used alone or in combination of two or more thereof.

The solvent may be a solvent that is commonly used in the art, and may be dimethyl sulfoxide (DMSO), isopropyl alcohol, n-methylpyrrolidone (NMP), acetone, water, and the like, and they may be used alone or in combination of two or more thereof. The amount of solvent used is sufficient if it can dissolve or disperse the metal oxide and the binder, taking into consideration the coating thickness of a slurry and production yield.

The electrode may be included in an electrochemical device, and the electrochemical device may be, for example, a lithium secondary battery, a lithium-sulfur battery, a capacitor, a magnesium secondary battery, or a sodium secondary battery.

Method for Producing Metal Oxide Coated with Conductive Polymer

According to still another embodiment of the present invention, a method for producing a metal oxide coated with a conductive polymer is provided, including: a protonation step of protonating a monomer; an adhesion step of stirring the protonated monomer and a metal oxide represented by Chemical Formula (1) to allow the protonated monomer to adhere to the surface of the metal oxide by electrostatic attraction; and a polymerization step of polymerizing the monomer to form a coating layer including a conductive polymer on the surface of the metal oxide.

The method for producing a metal oxide is capable of forming a coating layer composed of the conductive polymer by bonding the metal oxide represented by Chemical Formula (1) having a negative (−) charge and the monomer having a positive (+) charge by electrostatic attraction, and polymerizing the monomer on the surface of the conductive polymer.

If the metal oxide does not have a charge, or the monomer is not protonated so that it is not adhered to the surface of the metal oxide by the electrostatic attraction, the monomer may be dissolved in the solvent, and thus the monomer may be separately polymerized at a location outside the surface of the metal oxide in the polymerization process. However, as for the production method of the present invention, since the polymerization of the monomer is carried out on the surface of the metal oxide, it is possible to increase the recovery rate of the metal oxide coated with the conductive polymer used as an electrode active material, and the coating layer may be evenly formed on the surface of the metal oxide without irregularities.

The production method may include a step of protonating a monomer. The protonation may be carried out in a solution including the monomer, an acid, and a solvent.

The monomer is not particularly limited so long as it is polymerized to form a polymer having conductivity, and it may include, for example, at least one selected from the group consisting of pyrrole, aniline, thiophene, and indole.

The acid for protonating the monomer may include at least one selected from the group consisting of hydrochloric acid, sulfuric acid, and nitric acid. Meanwhile, the solvent is not particularly limited so long as it can easily dissolve the monomer and the acid, and it may include, for example, at least one selected from the group consisting of water, ethanol, methanol, and isopropanol.

The monomer and the acid in the solution may be mixed at a weight ratio of 1:1 to 4, 1:1 to 3, or 1:1 to 2. When the weight ratio of the monomer and the acid is less than 1:1, the monomer may not be sufficiently protonated, so that the monomer may be polymerized on the outside the surface of the metal oxide in the subsequent polymerization process. In contrast, when the ratio is more than 1:4, elution of lithium ions may occur or may be accelerated in a subsequent process.

A protonated monomer is produced by protonating the monomer, and then the protonated monomer and the metal oxide represented by Chemical Formula (1) are stirred, thus adhering the protonated monomer to the surface of the metal oxide by electrostatic attraction.

As described above, the protonated monomer has a positive (+) charge and the metal oxide represented by Chemical Formula (1) has a negative (−) charge. Thus, when stirred, the monomer may be strongly adhered to the surface of the metal oxide by electrostatic attraction.

Meanwhile, elements such as lithium may be eluted from the metal oxide represented by Chemical Formula (1) in an acidic solution. Thus, when the monomer is protonated after mixing the metal oxide and the monomer, lithium ions may be eluted from the metal oxide.

However, in the aforementioned production method, the monomer is protonated using an acid, and then the protonated monomer is stirred with the metal oxide. Thus, the method may be carried out in a neutral atmosphere, and for example, the pH may be 6 to 8.

The weight ratio of the metal oxide and the protonated monomer may be controlled according to the thickness of a desired coating layer formed on the surface of the metal oxide, and for example, the weight ratio may be 1:0.004 to 0.1. When the weight ratio is less than 1:0.004, high capacity characteristics of the electrode may not be exhibited, cycle stability may be decreased, or elements such as lithium may be eluted, and when the weight ratio is more than 1:0.1, the movement of lithium ions may be interrupted, thus deteriorating electrochemical properties of the electrode.

A polymerization initiator may be added after adhering the protonated monomer to the surface of the metal oxide. The polymerization initiator may include, for example, at least one selected from the group consisting of ammonium persulfate, ferric chloride, potassium persulfate, sodium persulfate, and potassium permanganate.

After the addition of the polymerization initiator, the protonated monomer can be polymerized to form a coating layer including the conductive polymer on the surface of the metal oxide. At this time, the polymerization reaction may be carried out at neutral pH in order to prevent elution of elements such as lithium from the metal oxide, and for example, the pH may be 6 to 8.

According to the present invention, a metal oxide coated with a conductive polymer in which the conductive polymer is uniformly coated on the surface of the metal oxide, and thus, when included in the electrode, an electrode having high output, high capacity, and excellent cycle stability can be provided by enhancing electrostatic capacitance; an electrode for an electrochemical device including the same; and a method for producing the metal oxide, may be provided.

EXAMPLES

The present invention will be described in more detail by way of examples shown below. However, these examples are given for illustrative purposes only, and the scope of the invention is not intended to be limited to or by these examples.

Example 1

0.2 g of cylindrical $LiMn_2O_4$ having a length of 500 nm and a diameter of 100 nm was prepared by dispersing in ethanol. In another beaker, 0.012 mmol of pyrrole, 0.012 mmol of hydrochloric acid, and 50 mL of ethanol were stirred to protonate the pyrrole.

Then, the protonated pyrrole was added to $LiMn_2O_4$ and stirred. At this time, the protonated pyrrole having a positive (+) charge was adhered to the surface of $LiMn_2O_4$ having a negative (−) charge by electrostatic attraction.

Subsequently, $FeCl_3$ was added as a polymerization initiator, and the protonated pyrrole was polymerized at a temperature of 25° C. for 6 hours to form a metal oxide including a coating layer composed of the conductive polymer on the surface of $LiMn_2O_4$.

Examples 2 to 6

Metal oxides coated with the conductive polymers of Examples 2 to 6 were prepared in the same manner as in Example 1, except that the monomers and hydrochloric acid and the contents thereof shown in Table 1 were used.

TABLE 1

|  | Example 1 | Example 2 | Example 3 | Example 4 | Example 5 | Example 6 |
| --- | --- | --- | --- | --- | --- | --- |
| Monomer | pyrrole | pyrrole | pyrrole | aniline | aniline | aniline |
| Content of monomer (mmol) | 0.012 | 0.03 | 0.06 | 0.06 | 0.18 | 0.3 |
| Content of hydrochloric acid (mmol) | 0.012 | 0.03 | 0.06 | 0.06 | 0.18 | 0.3 |

Comparative Example 1

$LiMn_2O_4$ not coated with a conductive polymer was prepared.

Comparative Example 2

A metal oxide coated with the conductive polymer of Comparative Example 2 was prepared in the same manner as in Example 1, except that the pyrrole was not protonated.

Evaluation

1. Evaluation of Surface of Metal Oxides

The metal oxides of Examples 1 to 6 and Comparative Examples 1 and 2 were photographed using a scanning electron microscope (SEM) and are shown in FIGS. 1 to 8, respectively.

Specifically, FIGS. 1 to 6(a) and (b) are images of the metal oxides coated with the conductive polymers of Examples 1 to 6 taken at magnification of 100,000 times and 50,000 times, respectively. Further, FIGS. 7(a) and (b) are images of $LiMn_2O_4$ not coated with the conductive polymer of Comparative Example 1 taken at magnification of 100,000 times and 50,000 times, respectively. Furthermore, FIGS. 8(a) and (b) are images of the metal oxide coated with the conductive polymer of Comparative Example 2 taken at magnification of 100,000 times and 50,000 times, respectively.

According to FIGS. 1 to 6, since the protonated pyrrole/aniline was polymerized in a state of being adhered to $LiMn_2O_4$ by electrostatic attraction, it was confirmed that the polymer coating layers were uniformly formed on LiMn$_2$O$_4$, and that the polymers of pyrrole/aniline were not separately formed in the solvent. Meanwhile, according to FIG. 8, which shows the images of Comparative Example 2 taken using SEM, it was confirmed that when the non-protonated pyrrole was polymerized after mixing it with LiMn$_2$O$_4$, the pyrrole was polymerized on the outside of the surface of the metal oxide.

2. Measurement of Specific Capacitance

Figure 1:
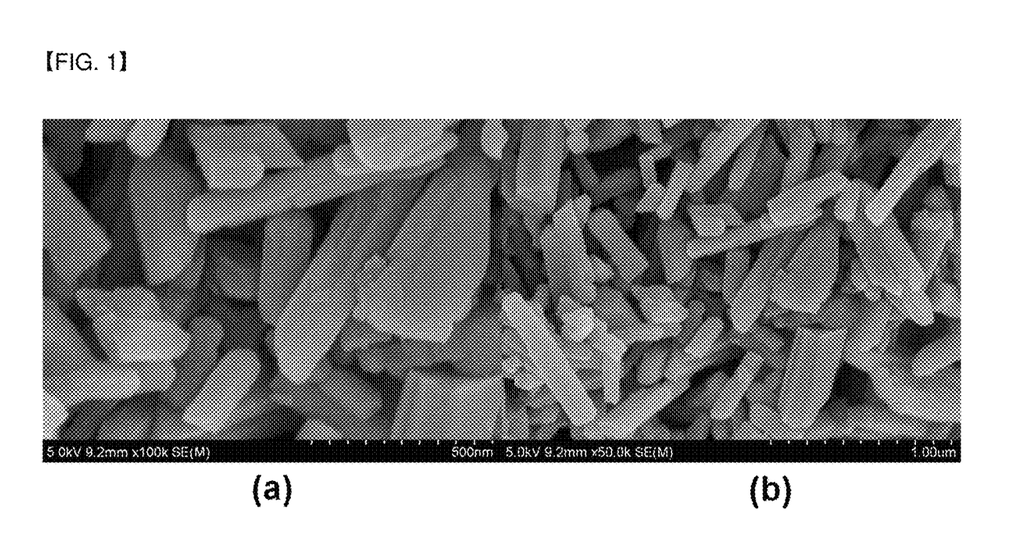
Figure 2:
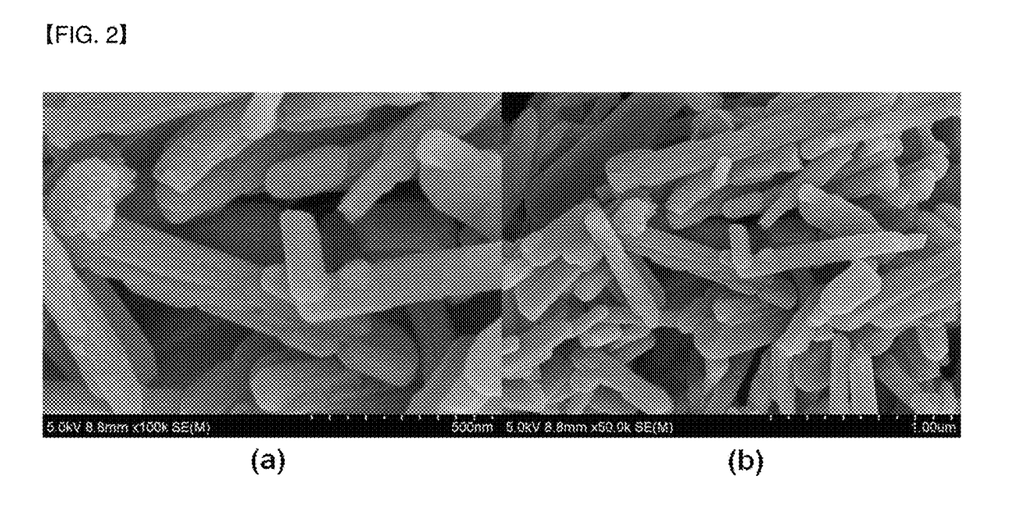
Figure 3:
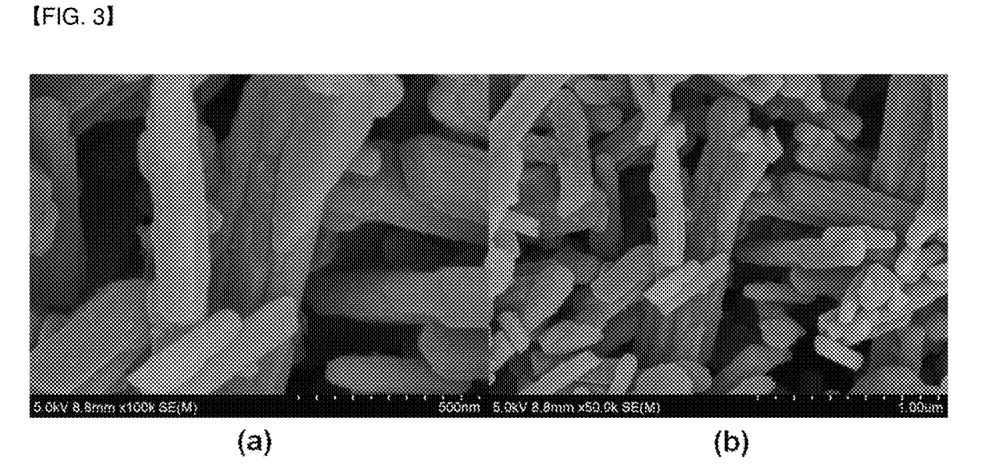
Figure 4:
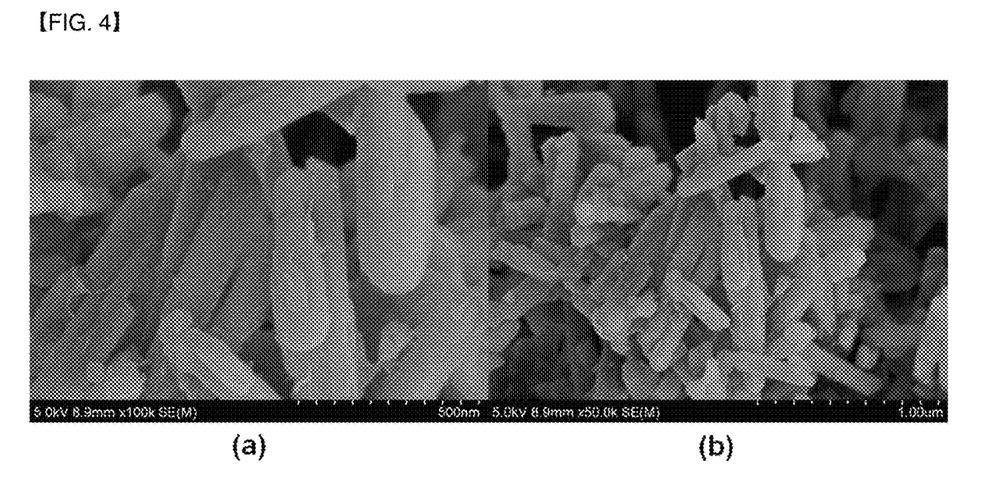
Figure 5:
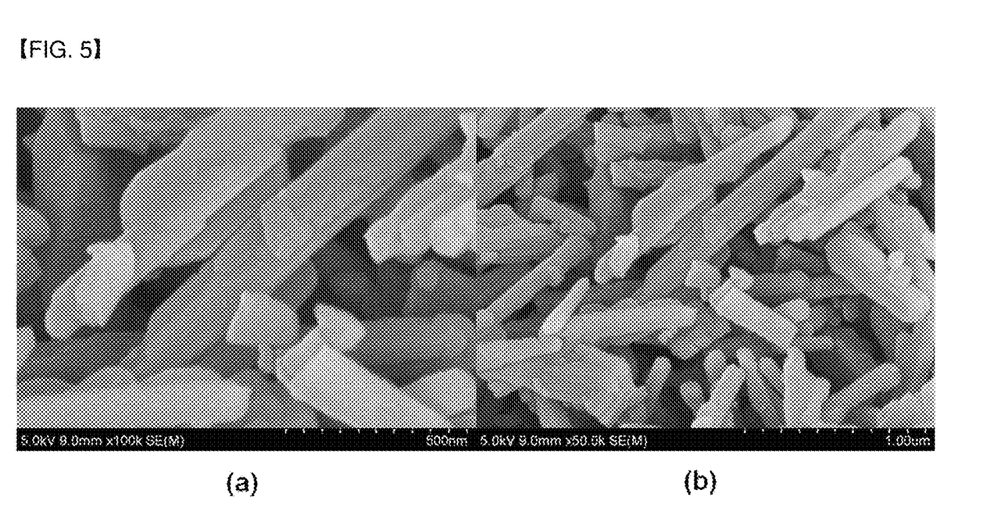
Figure 6:
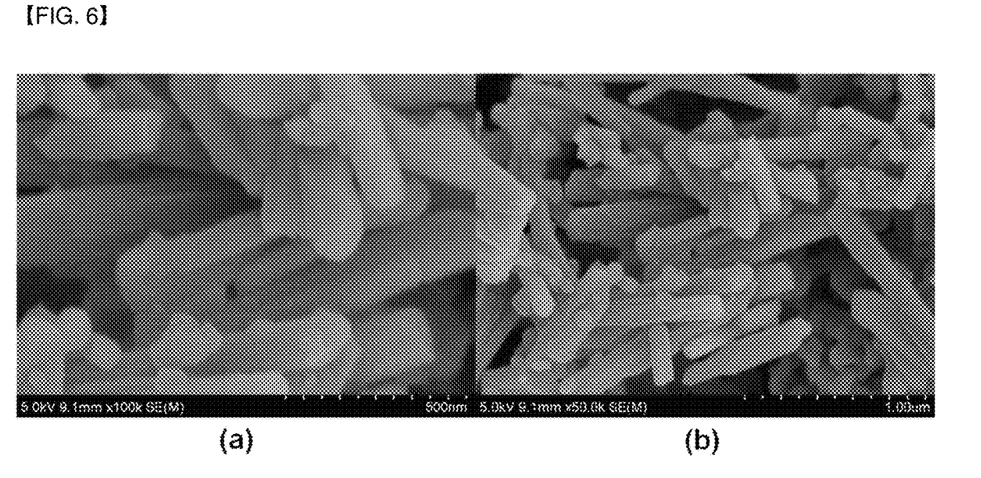
Figure 7:
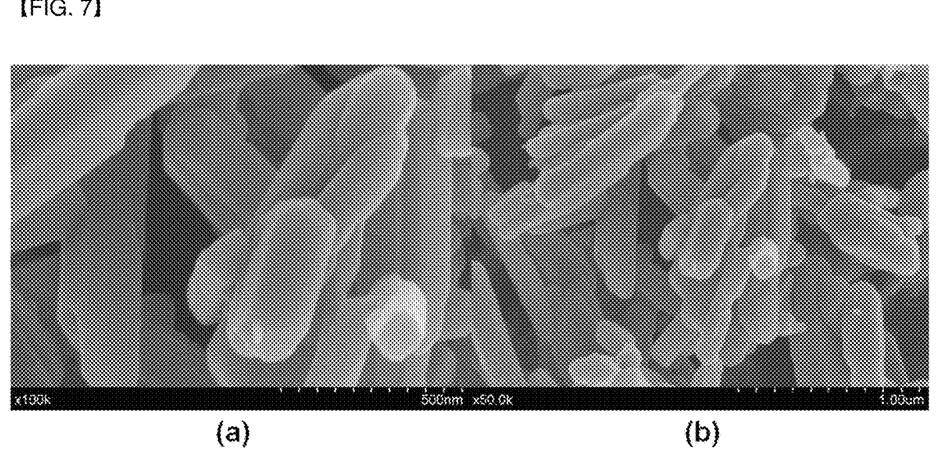
Figure 8:
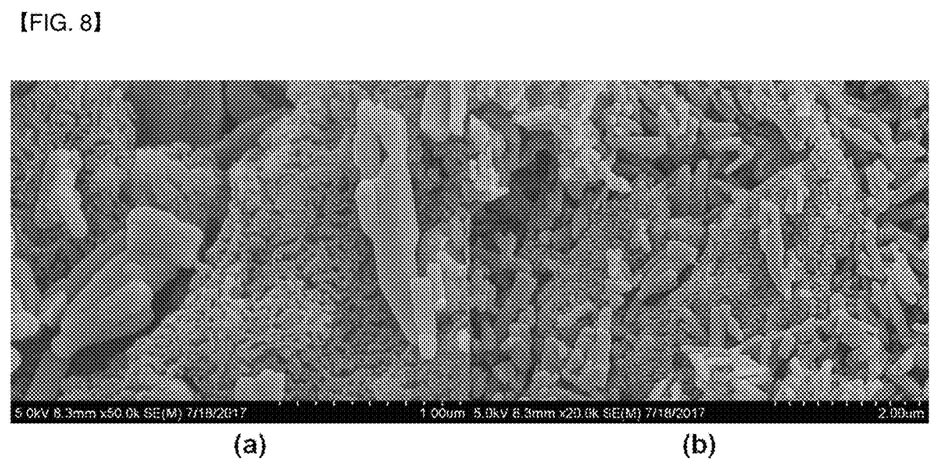
Figure 9:
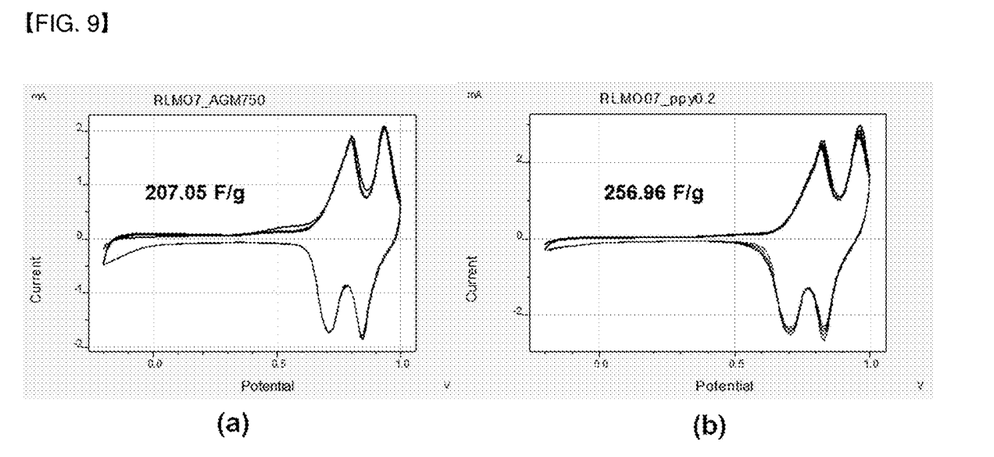
Figure 10:
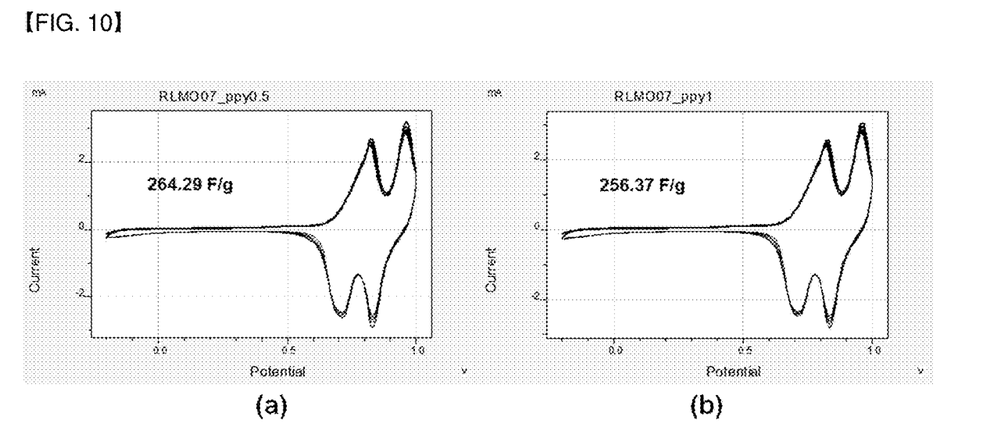

A solution in which the metal oxides of Examples 1 to 3 and Comparative Example 1; acetylene black, which is a conductive material for transferring current to a solution of N-methyl-2-pyrrolidone (NMP); and polyvinylidene fluoride serving as a binder for fixing particles were mixed at a weight ratio of 85:10:5 was prepared, then the solution was coated on a carbon electrode and dried to prepare a cathode electrode for a supercapacitor. The results of measuring specific capacitance by cyclic voltammetry (CV) with respect to the cathode electrode for a supercapacitor including the metal oxides of Examples 1 to 3 and Comparative Example 1 are shown in Table 2. Further, the results thereof are illustrated in the graphs of FIGS. 9 and 10, respectively.

TABLE 2

|  | Example 1 | Example 2 | Example 3 | Comparative Example 1 |
|---|---|---|---|---|
| Specific capacitance (F/g) | 256.96 | 264.29 | 256.37 | 207.05 |

According to Table 2, it was confirmed that the metal oxides Examples 1 to 3 in which conductive polymers were coated had specific capacitance that was significantly higher than that of Comparative Example 1 in which conductive polymers were not coated.

What is claimed is:

1. A metal oxide coated with a conductive polymer, comprising: a metal oxide represented by Chemical Formula (1) below; and
   a coating layer formed on the surface of the metal oxide and includes a conductive polymer, wherein the conductive polymer includes at least one polymer selected from the group consisting of polypyrrole and polyaniline,
   wherein the conductive polymer is a polymer of positively charged protonated monomers, and the conductive polymer is polymerized in a state in which the positively charged protonated monomers are adhered to the surface of the metal oxide having a negative charge by electrostatic attraction, and wherein the coating layer has surface roughness (Ra) of 0.1 to 5 nm:

$$Li_xMn_yO_{4-z}A_z \quad (1)$$

wherein 0.7≤x≤1.3, 1.7<y<2.3, 0≤z<0.2, and
   A is one or more ions having a valence of −1 or −2.

2. The metal oxide coated with a conductive polymer of claim 1, wherein the conductive polymer is coated onto 80 to 100% of the total surface area of the metal oxide.

3. The metal oxide coated with a conductive polymer of claim 1, wherein the coating layer has a thickness of 0.1 to 10 nm.

4. An electrode for an electrochemical device, comprising the metal oxide coated with the conductive polymer of claim 1.

5. The electrode for an electrochemical device of claim 4, wherein the electrochemical device is a lithium secondary battery, a lithium-sulfur battery, a capacitor, a magnesium secondary battery, or a sodium secondary battery.

6. The metal oxide coated with a conductive polymer of claim 1, wherein the conductive polymer includes a polypyrrole.

* * * * *